Figure 1:
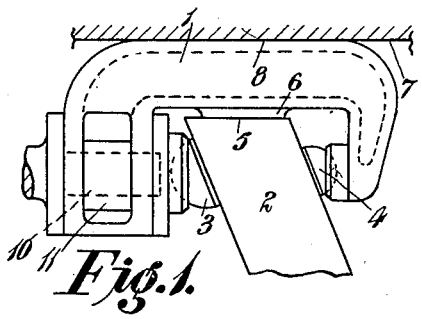

Nov. 11, 1930. A. G. M. MICHELL ET AL 1,781,069
MECHANISM FOR THE INTERCONVERSION OF RECIPROCATING AND ROTARY MOTION
Filed March 17, 1927 3 Sheets-Sheet 1

Inventors
Anthony G. M. Michell,
Joseph P. Postlethwaite
Thomas Smith,
By
Atty.

Patented Nov. 11, 1930

1,781,069

UNITED STATES PATENT OFFICE

ANTHONY GEORGE MALDON MICHELL, OF MELBOURNE, VICTORIA, AUSTRALIA, AND JOSEPH PEARSON POSTLETHWAITE AND THOMAS SMITH, OF LONDON, ENGLAND, ASSIGNORS, BY MESNE ASSIGNMENTS, TO MICHELL-CRANKLESS ENGINES CORPORATION, OF NEW YORK, N. Y., A CORPORATION OF NEW YORK

MECHANISM FOR THE INTERCONVERSION OF RECIPROCATING AND ROTARY MOTION

Application filed March 17, 1927, Serial No. 176,146, and in Great Britain March 18, 1926.

The present invention relates to improvements in mechanism for the interconversion of reciprocating and rotary motion of the type comprising a main shaft on which is mounted a disc or annular race in plane oblique to the shaft, the axes of the reciprocating members and shaft being parallel and their working loads transmitted either directly or through intermediate elements to the oblique disc or race.

The improvements pertain to the means by which the reciprocating member is guided and supported in its reciprocating motion and as said member engages with the peripheral portion of the swash-plate or slant forces are imposed upon the reciprocating member acting in varying directions transverse to the direction of its motion consequent upon the obliquity of the disc or race and means are required to support it in such transverse directions.

The reciprocating member usually forms or comprises a piston, or a pair of pistons, and it is supported as regards transverse forces acting in the plane containing its own axis and the axis of the slant, solely by the walls of the cylinder or cylinders in which the piston or pistons operate. In other constructions which have been proposed, the reciprocating member is supported by special guides external to the cylinder or cylinders (e. g. Australian Patent 20957/24 and United States Patent 1,603,852).

According to the present invention external guides of this kind are employed, and two or more distinct guide members are used for each reciprocating member in such manner that different guide members serve to support the reciprocating member in the plane above-mentioned and in the plane transverse thereto. In other words, the forces tending to produce transverse displacement of the reciprocating member in one of these planes are resisted by a guide member or guide members, distinct from the guide or guides which resist the forces in the other of such planes.

According to one such form of construction the former of these guide members is a surface formed upon the external casing of the machine concentric with the slant which surface will resist outward radial forces exerted upon the reciprocating member. The external cylindrical surface of the slant may also form such a guide member for resisting the forces mentioned in the direction radially inward.

The guide member or members supporting the forces acting in directions transverse to the plane containing both the axis of the slant and the axis of the reciprocating member may have various forms consistently with their supporting only such forces. According to one arrangement the portion of the reciprocating member which is immediately supported by such guide member is for this purpose connected to the remainder of the reciprocating member by an articulated link.

Figure 10:
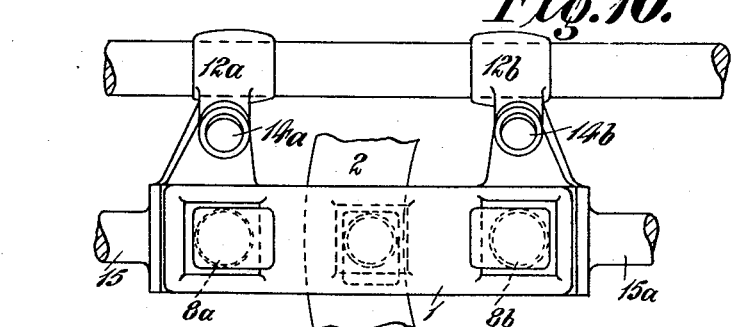
Figure 11:
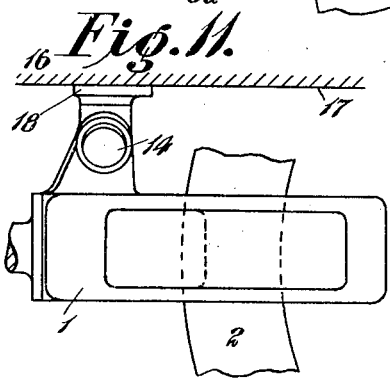
Figure 12:
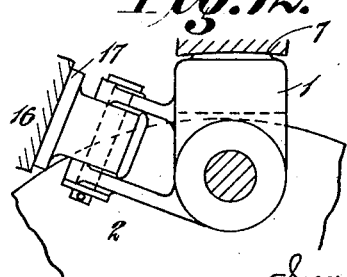
Figure 13:
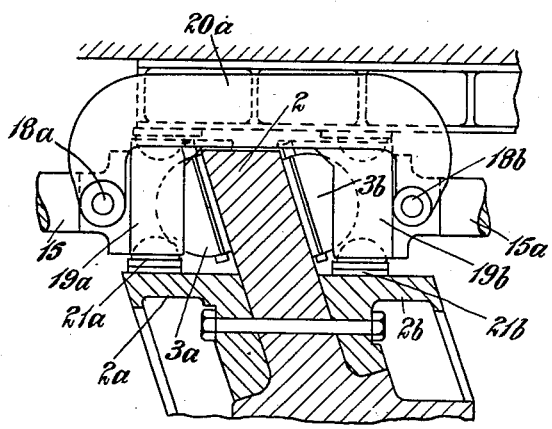
Figure 14:
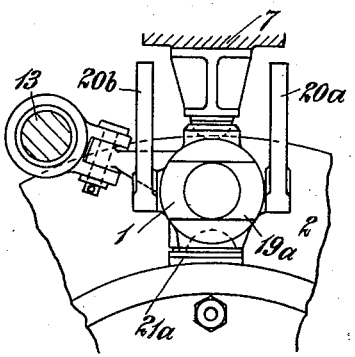
Figure 15:
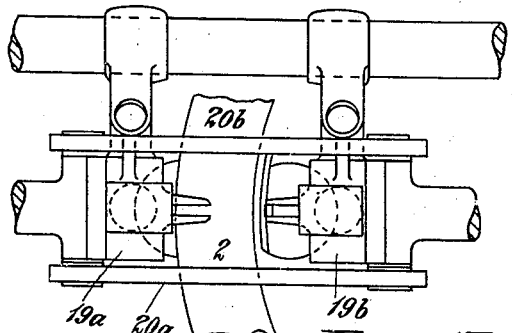

The accompanying drawings illustrate the application of the invention in various forms all of which embody a common principle of construction as hereinafter explained. In these drawings Figs. 1, 2, and 3, respectively, show the essential parts of the construction in elevational, cross-sectional and plan views. Figs. 4, 5 and 6, and Figs. 7, 8 and 9 are two corresponding series of views of constructions alternative to those of Figs. 1, 2 and 3. Fig. 10 is a plan view showing an adaptation of the construction illustrated in Figs. 4, 5, 6 to the case of a double-ended reciprocating member, that is, one which is symmetrical on the two sides of the slant. Figs. 11 and 12 are, respectively, a plan view and a cross sectional view and show a modification of the constructions illustrated in Figs. 7, 8, 9. Figs. 13, 14 and 15 are a further series of views corresponding to Figs. 1, 2 and 3, and showing another variant of the construction applicable to a double-ended reciprocating member.

As in the patent above cited, the reciprocating member comprises in all these constructions a yoke 1, and a swash-plate or slant 2 is employed formed with a cylindrical peripheral surface 5. According to the present invention the reciprocating member is guided or prevented from being displaced in the direction towards the axis of the rotating member by being supported directly, or with the interposition of a slipper, upon the cylindrical peripheral surface of the slant, while it is prevented from moving in the opposite or outward radial direction, by being guided upon a fixed member which may be a portion of the casing of the machine, parallel to, or concentric with, the said peripheral surface. Movement of the reciprocating member in a direction tangential to the slant is prevented by a guide member attached to or forming part of the frame of the machine, and the reciprocating member is supported upon this guide member through an interposed member linked to the reciprocating member. The purpose of this linkage is explained hereinafter.

Figure 2:
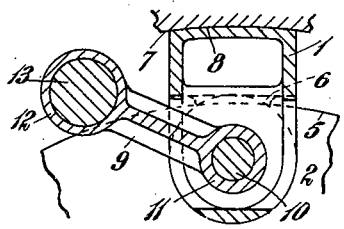
Figure 3:
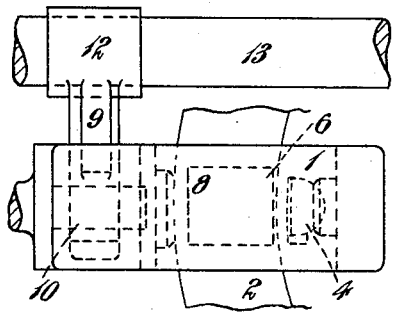

According to the construction shown in Figs. 1, 2 and 3, the reciprocating member, as in a typical construction, comprises a yoke element 1, embracing the peripheral portion of the slant 2, and is fitted with slippers 3, 4 by which the co-action between the yoke 1 and slant 2 is effected. The yoke 1 makes contact with the peripheral surface 5 of the slant 2 by means of the concave cylindrical bearing surface 6, and contact with the surface 7 which is turned on the fixed casing of the machine concentric with the peripheral surface 5, by means of the convex cylindrical surface 8. The link member 9 has one end attached to the yoke 1 by means of the pin 10 which is rigidly attached to the yoke and fits rotatably in the eye 11 of the link member. The opposite or outer end of the link member is also furnished with an eye member 12 which fits freely on the guide rod 13 fixed to the casing of the machine.

It will be seen that forces acting upon the yoke 1 in an inward radial direction relatively to the slant 2, are directly resisted by the contact of the surfaces 5 and 6, while forces acting radially outwards upon the yoke are directly resisted by contact of the surfaces 7 and 8. The mutual contacts of these pairs of surfaces, however, do not oppose movement of the yoke in a direction tangential to the slant, and forces acting on the yoke in either tangential direction are resisted solely by the link 9, and its contact with the rod 13.

Figure 4:
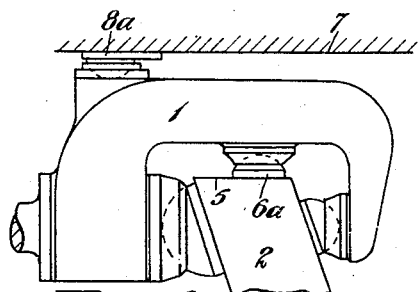
Figure 5:
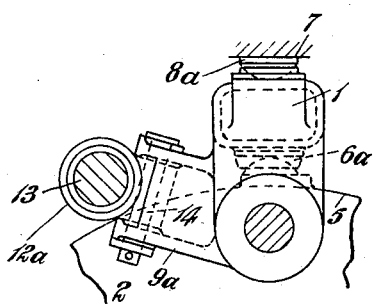
Figure 6:
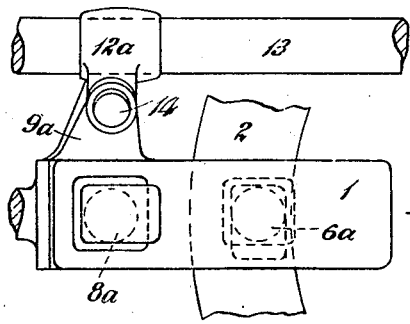

The construction shown in Figs. 4, 5 and 6 is similar to that shown in Figs. 1, 2 and 3 with the exception that contact between the yoke 1 and the bearing surfaces 5 and 7, instead of being effected by surfaces formed directly upon the yoke member is made through pivoted slippers 6$^a$, 8$^a$, mounted thereon, and that the means for resisting forces in tangential direction instead of being a link having pivotal end connections, consists of an eye member 12$^a$ fitting the rod 13 and pivotally attached by a pin 14 to the arm 9$^a$ of the yoke. It will be observed in Fig. 6 that the centre of the pin 14 is located slightly to the rear of the centre of figure of the eye member 12$^a$ having regard to the direction of motion of the yoke during the working stroke of the piston thus facilitating wedge film lubrication of the contact of the members 12$^a$ and 13.

The connection made by the pin 14, is such that the parts 9$^a$ and 12$^a$ are free to move slightly relatively to one another in the direction of the axis of the pin, as well as to rotate about said axis. It will be seen that this construction is, for the purposes of invention, equivalent to that shown in Figs. 1, 2 and 3.

Figure 7:
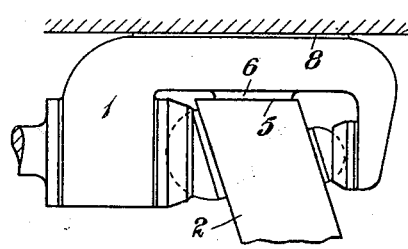
Figure 8:
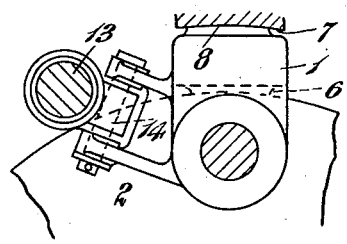
Figure 9:
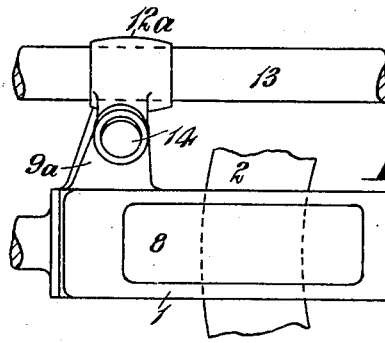

The construction shown in Figs. 7, 8 and 9 combines the construction of Figs. 1, 2 and 3 as regards the bearing surfaces 6 and 8, with the construction shown in Figs. 4, 5 and 6 as regards the arm 9$^a$, eye member 12$^a$ and pin 14.

The construction shown in plan view depicted in Fig. 10 is a duplication of the construction shown in the corresponding view depicted in Fig. 6 for use in cases where two piston elements are attached as by piston rods 15, 15$^a$ to the yoke 1. The bearing slipper 8$^a$ and eye member 12$^a$ being arranged to carry the principal radial and tangential forces acting when the piston attached to the rod 15 is loaded, and the slipper 8$^b$ and eye member 12$^b$ to carry the corresponding loads when the piston attached to the rod 15$^a$ is loaded.

The construction shown in Figs. 11 and 12 is similar to that shown in Figs. 8 and 9, except that instead of the rod 13, a fixed flat guide 16 is employed, making contact by means of its surface 17 with the shoe 18 which replaces the eye member 12$^a$ of Figs. 8 and 9. As in the latter figures the pin 14 is located eccentrically with respect to the bearing surface of the sliding element. This construction is of course intended for application when tangential forces of considerable magnitude are exerted in one direction only.

The construction shown in Figs. 13, 14 and 15 is the same as that shown in Fig. 10, except that the yoke 1 is shown as being pivotally connected to the piston rods 15, 15$^a$ by the pins 18$^a$, 18$^b$, and consists itself of four parts pivotally connected together, namely the parts 19$^a$, 19$^b$ which respectively support the slippers 3$^a$, 3$^b$ on the two sides of the slant 2, and the link members 20$^a$ and 20$^b$ which connect the parts 19$^a$ and 19$^b$ together, and with the further exception that the inward radial load is carried, not upon the periphery of the slant 2, but upon the peripheries of secondary members 2$^a$, 2$^b$, attached to and coaxial with the slant 2. To effect contact of the parts 19$^a$ and 19$^b$ of the yoke with said secondary members, the pivoted slippers 21$^a$ and 21$^b$ may be used.

We claim:—

1. In mechanism for the interconversion of reciprocating and rotary motion, an oblique swash plate, a reciprocating member having engagement with said swash plate, bearing surfaces on the reciprocating member, a fixed guide surface co-acting with one of said bearing surfaces and the other of said surfaces engaging the periphery of the swash plate, said surfaces resisting inward and outward radial forces imposed on the reciprocating member by the swash plate, a link pivotally connected to the reciprocating member, and a fixed guide member with which said link slidably engages said guide member resisting tangential forces imposed upon the reciprocating member by the swash plate.

2. In mechanism for the interconversion of reciprocating and rotary motion, an oblique swash plate, a reciprocating member having engagement with said swash plate, slipper bearing surfaces supporting said reciprocating member against inward and outward radial forces imposed thereon by the swash plate, a link member in pivotal connection with the reciprocating member and a fixed guide member with which said link engages to resist tangential forces applied to the swash plate.

3. In mechanism for the interconversion of reciprocating and rotary motion, an oblique swash plate, a reciprocating member having engagement with said swash plate and comprising a yoke member, a piston element pivotally connected to each end of the yoke member, a fixed guide surface, bearing surfaces at each of said ends supported respectively by the fixed guide surface and the swash plate, said surfaces supporting radially inward and outward forces imposed on the reciprocating member, a link pivotally attached to each of said ends, and a fixed guide member with which said links slidably engage, said guide member resisting tangential forces imposed upon the reciprocating member.

4. In mechanism for the interconversion of reciprocating and rotary motion, an oblique swash plate, a reciprocating member having engagement with said swash plate and comprising a yoke member, a piston element pivotally connected to each end of the yoke member, a guide surface, slipper bearing surfaces at each of said ends supported respectively by the fixed guide surface and the swash plate, said surfaces supporting radially inward and outward forces imposed on the reciprocating member, a link pivotally attached to each of said ends, and a fixed guide member with which said links slidably engage, said guide member resisting tangential forces imposed upon the reciprocating member.

5. In mechanism for the interconversion of reciprocating and rotary motion, an oblique swash-plate, secondary members thereon, a reciprocating member having engagement with said swash plate and comprising a yoke member, a piston element pivotally connected to each end of the yoke member, bearing surfaces at each of said ends supported respectively by the fixed guide surface and said secondary members, said surfaces supporting radially inward and outward forces imposed on the reciprocating member, a link pivotally attached to each of said ends, and a fixed guide member with which said links slidably engage, said guide member resisting tangential forces imposed upon the reciprocating member.

6. In mechanism for the interconversion of reciprocating and rotary motion, an oblique swash plate, secondary members thereon, a reciprocating member having engagement with the swash plate and comprising a yoke member, a piston element connected to each end of the yoke member, a fixed guide surface, slipper bearing surfaces at each of said ends supported respectively by the fixed guide surface and said secondary members, said surfaces supporting radially inward and outward forces imposed on the reciprocating member, a link pivotally attached to each of said ends, and a fixed guide member with which said links slidably engage, said guide member resisting tangential forces imposed upon the reciprocating member.

7. In mechanism for the interconversion of reciprocating and rotary motion, an oblique swash-plate, a reciprocating member consisting of a pair of piston elements in engagement with opposite sides of said swash plate, a four-part yoke member pivotally connected at both ends to said piston elements, bearing surfaces at both ends of said yoke member for supporting the reciprocating member against radially outward and inward forces imposed thereon by the swash plate, fixed guide members and links articularly connected to said reciprocating member and the fixed guide members upon which said links have slidable movement in unison with the reciprocating member, said links and guide members supporting tangential forces applied to the reciprocating member by the swash plate.

8. In mechanism for the interconversion of reciprocating and rotary motion, an oblique swash-plate, a reciprocating member consisting of a pair of piston elements in slipper engagement with opposite sides of said swash plate, a four-part yoke member pivotally connected at both ends to said piston elements, slipper bearing surfaces at both ends of said yoke member for supporting the reciprocating member against radially outward and inward forces imposed thereon by the swash plate, fixed guide members and links articularly connected to said reciprocating member and the fixed guide members upon which said links have slidable movement in unison with the reciprocating member, said links and guide members supporting tangential forces applied to the reciprocating member by the swash plate.

9. In mechanism of the character described, a reciprocating member, a shaft, a swash plate mounted thereon, means including a yoke for transmitting motion from said member to the swash plate, and means pivotally associated with said yoke for insuring the movement of the yoke in a straight line and resisting forces tangential to said swash plate.

10. In mechanism of the character described, a reciprocating member, a shaft, a swash plate mounted thereon, means including a yoke for transmitting motion from said member to the swash plate, and means pivotally asociated with said reciprocating member for insuring the movement of the yoke in a straight line and resisting forces tangential to said swash plate.

11. In mechanism of the character described, a reciprocating member, a shaft, a swash plate mounted thereon, means including a yoke for transmitting motion from said member to the swash plate, a fixed bearing surface engaging said yoke for resisting forces acting radially of the swash plate, and separate, independent means coacting with the yoke for insuring a straight line movement of the yoke and resisting forces tangential to the swash plate.

12. In mechanism of the character described, a swash plate, a reciprocating member operatively connected to the swash plate and adapted to transmit motion thereto, a pair of separate and distinct fixed bearing elements, said elements being angularly spaced around the axis of the swash plate, and bearing means associated with the reciprocating member and slidably engaging said bearing elements.

13. In mechanism of the character described, a swash plate, a reciprocating member operatively connected to the swash plate and adapted to transmit motion thereto, a pair of separate and distinct fixed bearing elements, said elements being angularly spaced around the axis of the swash plate, a bearing surface on the outer surface of the reciprocating member disposed in sliding engagement with one of said bearing elements, and means extending laterally from said reciprocating member and engaging said second bearing element for resisting forces tangential to the swash plate.

14. In mechanism for the interconversion of reciprocating and rotary motion, an oblique swash plate, a reciprocating member having engagement with said swash plate, slipper bearing surfaces supporting said reciprocating member against inward and outward radial forces imposed thereon by the swash plate, means pivotally associated with the reciprocating member, and a fixed guide member with which said means engages to resist tangential forces applied to the swash plate.

ANTHONY GEORGE MALDON MICHELL.
JOSEPH PEARSON POSTLETHWAITE.
THOS. SMITH.